(12) United States Patent
Kim et al.

(10) Patent No.: US 7,324,567 B2
(45) Date of Patent: *Jan. 29, 2008

(54) MODULATION FREQUENCY TUNABLE OPTICAL OSCILLATOR

(75) Inventors: Young Ho Kim, Daejeon-shi (KR); Eun Soo Nam, Daejeon-shi (KR); Kyoung Ik Cho, Daejeon-shi (KR); Bo Woo Kim, Daejeon-shi (KR); Myung Sook Oh, Daejeon-shi (KR)

(73) Assignee: Electronics and Telecommunications Research Institute, Daejeon-shi (KR)

( * ) Notice: Subject to any disclaimer, the term of this patent is extended or adjusted under 35 U.S.C. 154(b) by 418 days.

This patent is subject to a terminal disclaimer.

(21) Appl. No.: 11/017,654

(22) Filed: Dec. 22, 2004

(65) Prior Publication Data

US 2006/0078010 A1    Apr. 13, 2006

(30) Foreign Application Priority Data

Oct. 8, 2004    (KR)    ................ 10-2004-0080344

(51) Int. Cl.
 *H01S 3/30*    (2006.01)
(52) U.S. Cl. ............... 372/6; 372/72; 372/102; 372/20; 372/28; 372/18; 285/27; 285/37
(58) Field of Classification Search ............ 372/18, 372/20, 23, 26, 28, 6, 94, 102; 385/27, 37
See application file for complete search history.

(56) References Cited

U.S. PATENT DOCUMENTS

| | | | |
|---|---|---|---|
| 5,604,618 A * | 2/1997 | Mori et al. ............ 398/150 |
| 5,917,969 A | 6/1999 | Gavrilovic et al. |
| 6,134,250 A | 10/2000 | Koren et al. |
| H1926 H | 12/2000 | Carruthers et al. |
| 6,914,717 B1 * | 7/2005 | Islam ............... 359/334 |
| 6,975,796 B2 * | 12/2005 | Kim et al. .......... 385/37 |
| 2002/0071457 A1 * | 6/2002 | Hogan ............... 372/23 |

OTHER PUBLICATIONS

Ho-Young Kim, et al.; "Millimeter Frequency Modulated Lasers Usign the Wavelength Dependent Birefringences Inside the Coupled Fiber Cavity"; pp. 125-129.

(Continued)

*Primary Examiner*—Minsun Oh Harvey
*Assistant Examiner*—Kinam Park
(74) *Attorney, Agent, or Firm*—Lowe Hauptman Ham & Berner LLP

(57) ABSTRACT

Provided is a millimeter-wave band frequency optical oscillator that can be used as an oscillation frequency signal source for a millimeter-wave forwarded to wireless subscribers from a base station of a millimeter-wave wireless subscriber communication system for a next generation (e.g., fifth generation) ultra-high speed wireless internet service. A pair of an optical fiber amplifier and an optical fiber grating mirror is connected to each of input/output ports of a loop mirror in parallel, so that a dual mode laser resonator is formed which can make simultaneous oscillation in two laser modes suitable for each wavelength. Accordingly, it is possible to obtain a light source that is modulated to a ultra-high frequency (over 60 GHz) by a beat phenomenon between the two laser modes.

5 Claims, 4 Drawing Sheets

OTHER PUBLICATIONS

Hiroaki Sanjih, et al.; "A Precisely Spaced Multiwavelength Light Source with a Pulsed Serrodyne Frequency Shifter in an Optical Ring Circuit"; Tunable and Multiwavelength Lasers 3.3.5.

Y.S. Yun, et al.; "Traveling-wave Electroabsorption Modulator with Enhanced Linearity in Millimeter-wave Band"; Lab of Optoelectronics and Optical Communications, Chung-An University, Korea; pp. 47-50.

* cited by examiner

MODULATION FREQUENCY TUNABLE OPTICAL OSCILLATOR

CROSS-REFERENCE TO RELATED APPLICATION

This application claims priority to and the benefit of Korean Patent Application No. 2004-80344, filed on Oct. 8, 2004 the disclosure of which is incorporated herein by reference in its entirety.

BACKGROUND

1. Field of the Invention

The present invention relates generally to a millimeter-wave band frequency optical oscillator that can be used as an oscillation frequency signal source for a millimeter-wave forwarded to wireless subscribers from a base station of a millimeter-wave wireless subscriber communication system for next generation (e.g., fifth generation) ultra-high speed wireless internet service. More particularly, the present invention relates to a modulation frequency tunable optical oscillator including an optical fiber amplifier and an optical fiber grating mirror which are connected to each of input/output ports of a loop mirror to realize simultaneous oscillation in two laser modes suitable for each wavelength.

2. Discussion of Related Art

Generally, a communication technology that uses a millimeter-wave band to provide high-capacity information of about 100 Mbps to subscribers is being studied and developed as a next generation (e.g., fifth generation) personal wireless technology by institutes at home and abroad studying communication technologies. Because the millimeter-wave band is greatly attenuated on air, wireless communication must be made in a local area having an effective distance less than 200 m. It, therefore, needs a repeater at a position close to subscribers, wherein a high frequency optical signal in a millimeter-wave band, which carries information, is forwarded to the repeater through an optical line. At this time, a high frequency optical oscillator is used as an oscillation frequency signal source that generates the high frequency optical signal.

A method of using semiconductor high frequency optical modulation and a method of using self-modulation in a resonator have been studied and developed in the art from five to six years ago. The method of using optical modulation is being studied and developed with a frequency region having the highest frequency of 40 GHz. As the method using self-modulation, optical fiber oscillators having a complex resonator structure have been developed with a 60~80 GHz frequency region.

For example, a ring resonator having an optical fiber grating mirror was proposed in Korean Patent Application No. 2002-3529 (Jan. 22, 2002). A similar high frequency laser light source based on the ring resonator was also developed.

However, in the conventional optical oscillator as described above, a laser mode reciprocating along a pair of optical fiber grating mirrors passes over about two times the resonance length compared to a transmitting laser mode. Accordingly, there are great differences in a birefringence phenomenon and a resonant frequency between the two modes. It increases a modulation frequency between the two modes, but relatively reduces an adjustment width of a polarization adjuster (polarization state) to make simultaneous oscillation in the two modes.

SUMMARY OF THE INVENTION

The present invention is directed to an excellent modulation frequency tunable optical oscillator that oscillates at a high modulation frequency over 60 GHz, which has not been commercially used.

One aspect of the present invention is to provide a modulation frequency tunable optical oscillator, comprising: a pair of wavelength couplers for receiving a pump light of a given wavelength; a loop mirror having both ports, each of the ports being connected to one end of the pair of wavelength couplers; a coupler connected to the loop mirror for outputting light; optical amplification optical fibers each connected to the other ends of the pair of wavelength couplers; and optical fiber grating mirrors each connected to the optical amplification optical fibers, wherein light output from the optical amplification optical fibers is reflected by the loop mirror with different reflectivity per wavelength and is input into the optical fiber grating mirrors through the optical amplification optical fibers, and light in a different wavelength region is reflected by the optical fiber grating mirrors, thereby realizing a dual laser mode resonator.

It is preferable that the pair of wavelength couplers and the loop mirror are interconnected through a 50% coupler.

Preferably, the loop mirror includes a dispersion compensated fiber and a polarization adjuster.

Preferably, one of the optical fiber grating mirrors is a wavelength fixed optical fiber grating mirror, and the other is a wavelength tunable optical fiber grating mirror.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and fully convey the scope of the invention to those skilled in the art.

Figure 1:
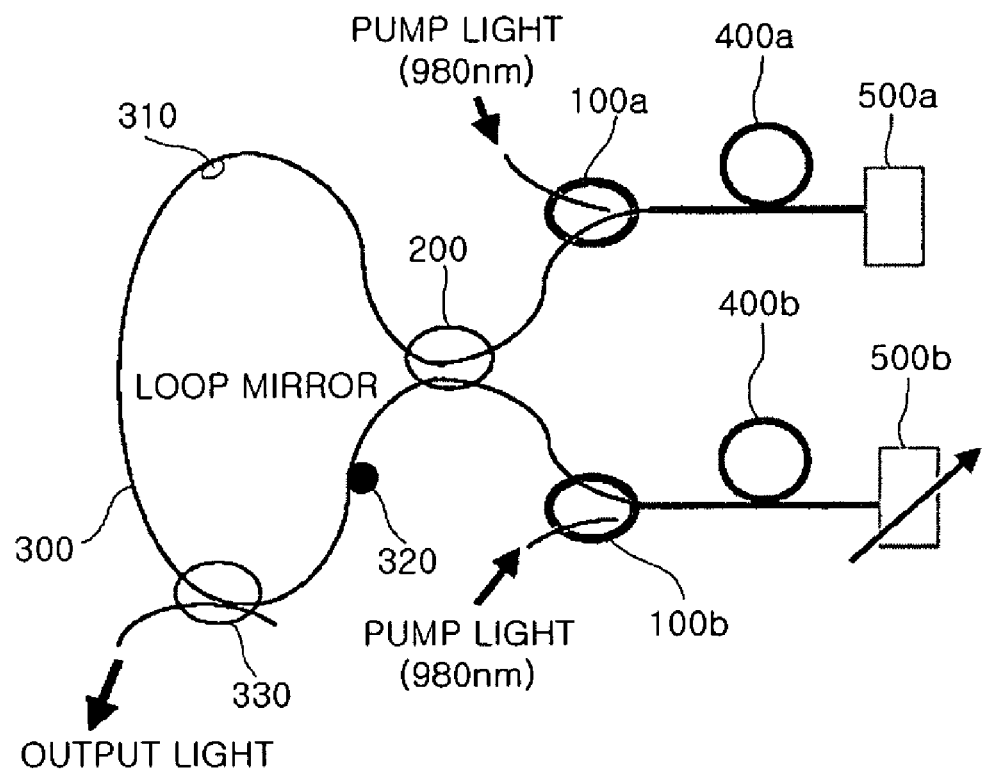
FIG. 1 is a schematic diagram of a modulation frequency tunable optical oscillator according to an embodiment of the present invention.

FIG. 1 is a schematic diagram of a modulation frequency tunable optical oscillator according to an embodiment of the present invention.

Referring to FIG. 1, a pair of wavelength couplers (980/1550 nm) 100a and 100b for receiving a pump light of 980 nm wavelength are connected to input/output ports of a loop mirror 300 through a 50% coupler 200, respectively. The loop mirror 300 includes a dispersion compensated fiber (L=1 m) 310, a polarization adjuster 320, and a 10% coupler 330 for outputting light.

Optical amplification fibers (Er, 2 m) 400a and 400b are connected to the other ends of the pair of wavelength couplers 100a and 100b to amplify the light, respectively. Optical fiber grating mirrors, namely, a wavelength fixed optical fiber grating mirror 500a and a wavelength tunable optical fiber grating mirror 500b are connected to outputs of the optical amplification optical fibers (Er, 2 m) 400a and 400b, respectively.

The loop mirror 300 is a circuit designed so that input lights, divided by 50%, are forwarded along the optical fiber in an opposite direction and then are returned to an original position by connecting two output ports of the 50% coupler 200, namely, a 2×2 optical fiber coupler to an optical fiber having a proper length. Reflectivity is a ratio at which the input lights, forwarded along the optical fiber, are returned and recombined at an original port. At this time, a combination ratio depends on polarization. If the optical fiber of the loop mirror 300 has no birefringence, the lights are combined 100% resulting in total internal reflection. If the optical fiber has birefringence, it reduces the reflectivity (less than 10%). Thus, the reflectivity of the loop mirror 300 is determined by the birefringence of the optical fiber constituting the loop mirror.

The optical fiber grating mirrors 500a and 500b are wavelength selection type mirrors having a function of reflecting light in one specific wavelength region, determined by a given period, and transmitting light in other wavelength regions, using periodic variation of the index of refraction of an optical path at a center of the optical fiber.

That is, by disposing the optical fiber grating mirrors 500a and 500b at one ends of the optical amplification optical fibers 400a and 400b, the light, which is output from the optical amplification optical fibers 400a and 400b, is reflected by the loop mirror 300 with different reflectivity per wavelength, and is amplified by the optical amplification optical fibers 400a and 400b, is input into the optical fiber grating mirrors 500a and 500b. At this time, the light in the specific wavelength region is reflected and the light in other wavelength regions is transmitted by the optical fiber grating mirrors 500a and 500b, thereby obtaining a resonator in which only the light reflected by the optical fiber grating mirrors 500a and 500b reciprocates.

Meanwhile, in the embodiment of the present invention as described above, parallel connection of a pair of the optical amplification optical fibers 400a and 400b and the optical fiber grating mirrors 500a and 500b by independently using the two input/output ports of the 50% coupler 200 connected to the loop mirror 300 forms two resonators in one loop mirror 300, thereby generating a dual mode laser light having the same initial phase.

That is, two resonators associated with the optical fiber grating mirrors 500a and 500b are achieved by disposing, in parallel, a pair of optical fiber grating mirrors 500a and 500b that reflect only light of a specific wavelength, and independent laser modes are realized by the reflectivity of the loop mirror 300. Further, it is possible to realize two laser modes by analyzing the reflectivity by the birefringence and fabricating the optical fiber grating mirrors 500a and 500b suitable for the reflectivity, and to obtain a light source having a modulation frequency that can be broadly varied from 20 to 160 GHz.

Further, according to the present invention, laser light is oscillated by the resonator during once resonance at a wavelength at which a total gain obtained by summing a gain of an optical amplification medium and a gain resulting from reflectivity of the optical fiber grating mirrors 500a and 500b at both ends of the resonator is maximized.

Figure 2A:
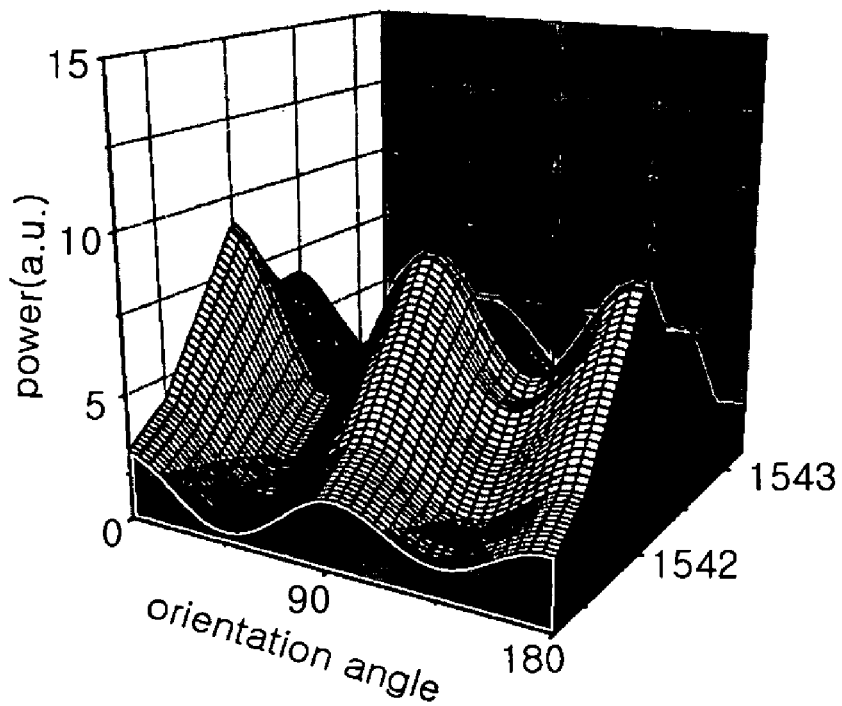
FIGS. 2a and 2b are graphs showing a comparison between gains obtained by a polarization adjuster making an adjustment depending on the wavelength of light.
Figure 2B:
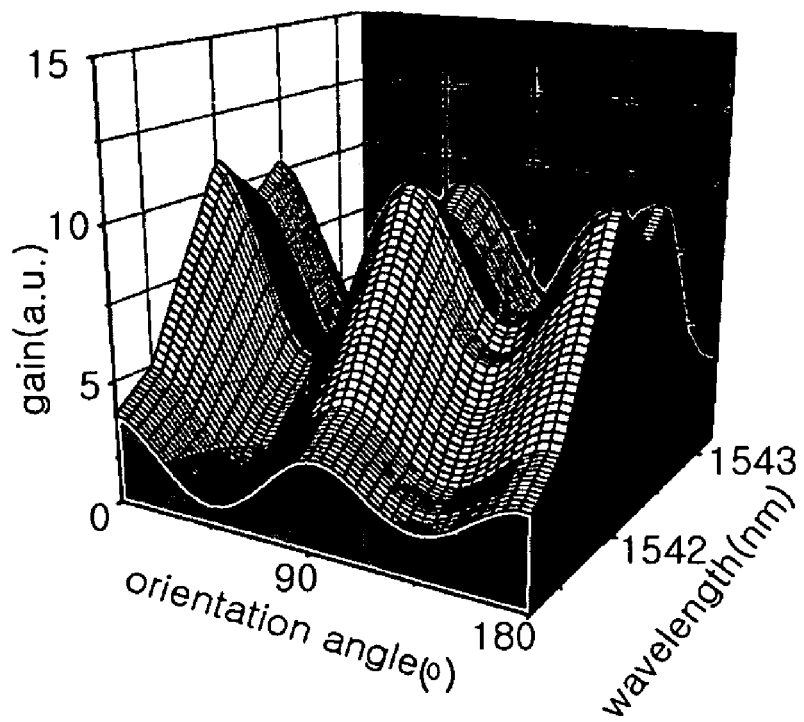

FIGS. 2a and 2b are graphs showing a comparison between gains obtained by a polarization adjuster making an adjustment depending on the wavelength of light. FIG. 2a is a graph showing a comparison between gains obtained by a polarization adjuster making an adjustment depending on a wavelength of light using an existing serial optical oscillator, and FIG. 2b is a graph showing a comparison between gains obtained by a polarization adjuster making an adjustment depending on a wavelength of light using an optical oscillator according to an embodiment of the present invention.

At this time, the existing serial optical oscillator is composed of a loop mirror, a wavelength coupler, an optical amplification optical fiber, a wavelength fixed and a wavelength tunable optical fiber grating mirror (not shown), all of which are connected in series, so that a dual mode laser resonator is achieved which is capable of realizing two laser modes suitable for each wavelength.

This existing serial optical oscillator requires that two lasers have the same divided gain of the optical amplification medium. Accordingly, the wavelength and polarization of the optical fiber grating mirror is required to properly select, and the reflectivity of the loop mirror depends on irregular birefringence in the optical fiber.

Meanwhile, the parallel optical oscillator according to an embodiment of the present invention has less dependency on the birefringence of the optical fiber and thus is stable against the polarization. Further, it is possible to avoid a technical difficulty in dividing the gain of the optical amplification optical fibers 400a and 400b. Further, it is possible to obtain a very high frequency (e.g., more than about 60 GHz) light source capable of implementing an excellent function of easily changing the modulation frequency, by adjusting one optical fiber grating mirror. Besides, there is no need for expensive components such as a direction indicator or a polarizer, which has been needed in the conventional optical oscillator, thus implanting a more simplified optical oscillator.

Referring to FIG. 2a, it shows a simulation result of a total gain when the dispersion compensated fiber has a length of 5 m and optical power is 40 mW at 980 nm. It can be seen that there is a great difference between maximum gains of two laser modes.

Referring to FIG. 2b, it shows a simulation result under the same conditions as in FIG. 2a. It can be seen that two dual modes have a different size at a center wavelength of the optical fiber grating mirrors 500a and 500b, but they are balanced compared to the case of FIG. 2a.

Figure 3:
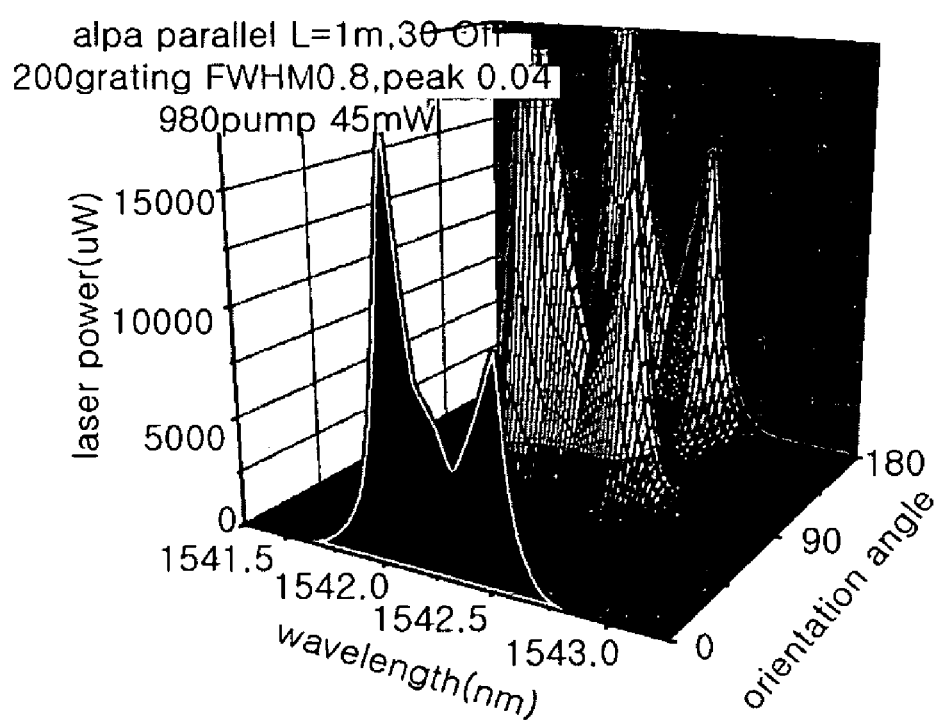
FIG. 3 is a graph showing an optical spectrum of an optical oscillator depending on a change in an orientation angle of a polarization adjuster applied to an embodiment of the present invention.

FIG. 3 is a graph showing an optical spectrum of an optical oscillator depending on a change in an orientation angle of a polarization adjuster applied to an embodiment of the present invention.

Referring to FIG. 3, it shows a simulation result of optical power in the laser mode with the same gain as that of FIG. 2b. It can be seen that the optical power is slightly changed at a 90° period by the polarization adjuster 320 included in the loop mirror 300.

Figure 4:
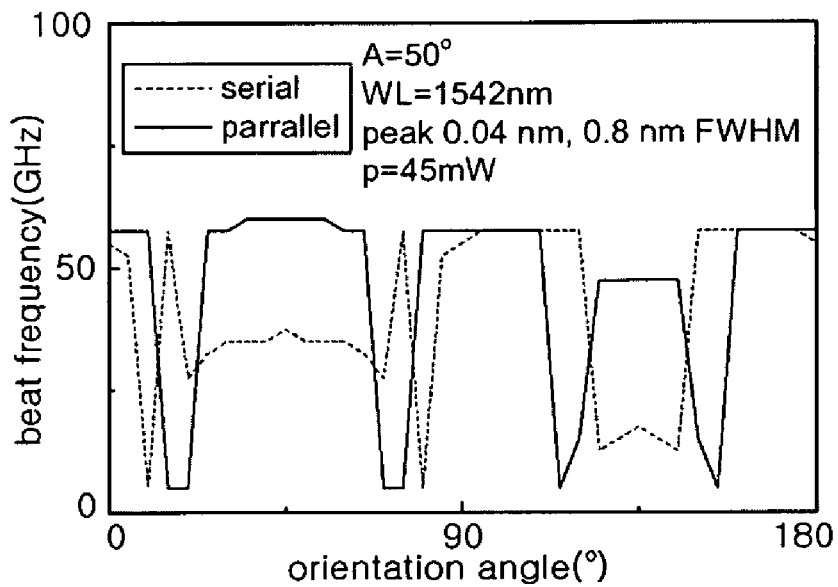
FIG. 4 is a graph showing a comparison between features that a modulation frequency varies with a change in an angle of a polarization adjuster.

FIG. 4 is a graph showing a comparison between features that a modulation frequency varies with a change in an angle of a polarization adjuster.

Referring to FIG. 4, it shows a simulation result of a beat frequency between two laser modes having the highest gain. It is a result under presumption that a discrepancy angle of an optical axis of the optical fiber included in the loop mirror 300 is about 50°, which may inevitably be caused upon fabricating the optical fiber.

That is, it can be seen that when the optical axis is matched, both the existing serial optical oscillator and the inventive optical oscillator do not undergo great change with respect the change in the orientation angle of the polarization adjuster 320. It exhibits excellent stability against the polarization. On the other hand, when the optical axis is not matched, the existing serial optical oscillator is very sensitive to change in the gain dependent on change in the reflectivity while the inventive parallel optical oscillator is very stable against the change in the angle of the polarization adjuster 320, namely, the change in the polarization because it obtains the gain of the optical fiber by itself.

Figure 5:
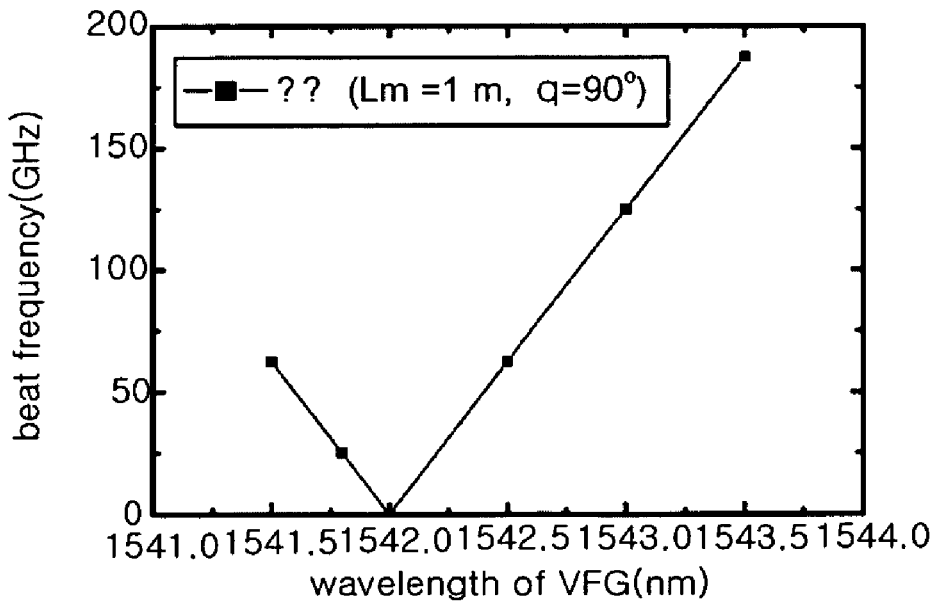
FIG. 5 is a graph showing a change in a modulation frequency of an optical oscillator with respect to a change in a reflected light wavelength of an optical fiber grating mirror.

FIG. 5 is a graph showing a change in a modulation frequency of an optical oscillator with respect to a change in a reflected light wavelength of an optical fiber grating mirror.

Referring to FIG. 5, it shows a simulation result when the wavelength fixed optical fiber grating mirror 500a is fixed to have 1542.0 nm, which is a wavelength that can obtain a maximum gain using the polarization adjuster 320, and a center wavelength of reflected light is changed from 1541.5 nm to 1543.5 nm using the wavelength tunable optical fiber grating mirror 500b. It can be seen that a tunable frequency feature in the range of 20 to 160 GHz is obtained, as shown in FIG. 5.

According to the modulation frequency tunable optical oscillator of the present invention as described above, a set of optical amplification optical fiber and optical fiber grating mirror is connected to each of the two input/output ports of the loop mirror in parallel to form a dual mode laser resonator that is capable of making simultaneous oscillation in two laser modes suitable for each wavelength. It is possible to obtain a high frequency optical oscillator with a simple configuration in which a modulation frequency of a laser light, generated from a single laser optical generator, is successively tunable from 20 to 160 GHz by adjusting a reflected wavelength of the optical fiber grating mirror. The oscillator can be used as a frequency oscillator and a high frequency optical signal generator for optical wireless integrated millimeter-wave communication equipment for a ultra-high speed wireless internet service. Moreover, when the oscillator is utilized as a key component of a wired ultra-high speed optical transmission system, an imported goods substitution effect and a cost saving effect can be obtained.

Further, according to the present invention, the two resonators obtain the gain of the optical amplification optical fiber by itself using the different input/output ports of the loop mirror, and thus very stable oscillation in two laser modes can be realized.

Although the modulation frequency tunable optical oscillator according to the preferred embodiment of the present invention has been described, the present invention is not limited to the embodiments and may be embodied in different forms without departing from the spirit and scope of the invention.

What is claimed is:

1. A modulation frequency tunable optical oscillator, comprising:
    a pair of wavelength couplers for receiving a pump light of a given wavelength;
    a loop mirror having both ports, each of the ports being connected to one end of the pair of wavelength couplers;
    a coupler connected to the loop mirror for outputting light;
    optical amplification optical fibers each connected to the other ends of the pair of wavelength couplers; and
    optical fiber grating mirrors each connected to the optical amplification optical fibers,
    wherein light output from the optical amplification optical fibers is reflected by the loop mirror with different reflectivity per wavelength and is input into the optical fiber grating mirrors through the optical amplification optical fibers, and light in a different wavelength region is reflected by the optical fiber grating mirrors, thereby realizing a dual laser mode resonator.

2. The modulation frequency tunable optical oscillator according to claim 1, wherein the pair of wavelength couplers and the loop mirror are interconnected through a 50% coupler.

3. The modulation frequency tunable optical oscillator according to claim 1, wherein the loop mirror comprises a dispersion compensated optical fiber and a polarization adjuster.

4. The modulation frequency tunable optical oscillator according to claim 1, wherein the coupler is a 10% coupler.

5. The modulation frequency tunable optical oscillator according to claim 1, wherein one of the optical fiber grating mirrors is a wavelength fixed optical fiber grating mirror, and the other is a wavelength tunable optical fiber grating mirror.

* * * * *